(12) United States Patent
Rogers et al.

(10) Patent No.: US 6,571,037 B1
(45) Date of Patent: May 27, 2003

(54) ARRAYED WAVEGUIDE GRATINGS

(75) Inventors: David C Rogers, Ipswich (GB);
Graeme D Maxwell, Ipswich (GB);
Alistair James, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/959,334

(22) PCT Filed: May 19, 2000

(86) PCT No.: PCT/GB00/01919

§ 371 (c)(1),
(2), (4) Date: Oct. 23, 2001

(87) PCT Pub. No.: WO00/72066

PCT Pub. Date: Nov. 30, 2000

(30) Foreign Application Priority Data

| May 21, 1999 | (EP) | 99303961 |
| May 21, 1999 | (EP) | 99303962 |
| May 21, 1999 | (EP) | 99303963 |
| May 21, 1999 | (EP) | 99303964 |

(51) Int. Cl.[7] .............................................. G02B 6/34
(52) U.S. Cl. ............................ 385/37; 385/130; 385/46
(58) Field of Search ............................ 385/37, 46, 43, 385/14, 15, 130, 123, 124

(56) References Cited

U.S. PATENT DOCUMENTS

| 4,999,686 A | 3/1991 | Autier .......................... 357/16 |
| 5,136,671 A | * 8/1992 | Dragone ....................... 385/46 |

FOREIGN PATENT DOCUMENTS

| EP | 0285351 A | 10/1988 |
| EP | 0297851 A | 1/1989 |
| EP | 0583903 A | 2/1994 |
| EP | 0793122 A | 9/1997 |
| WO | WO 94 16345 A | 7/1994 |

OTHER PUBLICATIONS

Patent Abstracts of Japan, vol. 1998, No. 09, Jul. 31, 1998, & JP 10 090543A, Apr. 10, 1998.
Patent Abstracts of Japan, vol. 1997, No. 03, Mar. 31, 1997 & JP 08 304644 A, Nov. 22, 1996.
Spiekman et al, "Ultrasmall Waveguide Bends: The corner Mirrors of the Future!", IEE Proceedings: Optoelectronics, vol. 142, No., Feb. 1, 1995, pp. 61–65.

(List continued on next page.)

Primary Examiner—Phan T. H. Palmer
(74) Attorney, Agent, or Firm—Nixon & Vanderhye P.C.

(57) ABSTRACT

An arrayed waveguide grating [WDG] comprises I/O slabs (53a, 53b) interconnected by a grating region (51). The grating region (51) comprises many, e.g. at least 25 and preferably 50 to 500, individual cores (61,62,63), which have different lengths so as to provide wavelength selectivity by causing phase changes in light conveyed between the I/O slabs (53a, 53b). There are bends (64) for providing the different lengths and, to improve optical guidance round the bends, empty (R.I.=1) grooves (71) are located adjacent to the inside (71.1) and outside radii (71.2) so that the evanescent fields extend into the grooves (71). In order to keep the dimensions small, which improves the optical accuracy, tight bends (preferred radii of curvature of less than 2 mm and especially less than 500 μm) are desirable. The grooves conveniently have tapered ends and they extend into straight portions adjacent to the bends. The WDG is preferably implemented in silica glass with dopants to adjust the refractive index and/or the melting point.

12 Claims, 3 Drawing Sheets

OTHER PUBLICATIONS

Li et al, "Silica–Based Optical Integrated Circuits", IEE Proceedings: Optoelectronics, GB, Instititution of Electricalengineers, Stevenage, vol. 143, No. 5, Oct. 1, 1996, pp. 263–280.

Seo et al, "Low Transition Losses in Bent Rib Waveguides", Journal of Lightwave Technology, US, IEEE, New York, vol. 14, No. 10, Oct. 1, 1996, pp. 2255–2259.

Himeno et al, "Loss Measurement and Analysis of High–Silica Reflection Bending Optical Waveguides", Journal of Lightwave Technology, vol. 6, No. 1, Jan. 1, 1988, pp. 41–46.

Chulhun Seo et al, "Optical Bent Rib Waveguide with Reduced Transition Losses", IEEE Transactions on Magnetics, vol. 32, No. 3, May 1996, pp. 930–933.

Suzuki et al, "High Density Integrated Planar Lightwave Circuits Using SI02–GE02 Waveguides with a High Refractive Indec Difference", Journal of Lightwave Technology, vol. 12, No. 5, May 1, 1994, pp. 790–796.

Tietgen, "Problems of the Topography of Integrated Optical Circuits", FREQUENZ, 35 (1981) 9, pp. 247–253.

* cited by examiner

ARRAYED WAVEGUIDE GRATINGS

RELATED APPLICATIONS

This application is related to the following co-pending commonly assigned applications: 09/959,324 filed Oct. 23, 2001 naming inventors Rogers, Maxwell and Poustie; 09/959,329 filed Oct. 23, 2001 naming inventors Rogers, Maxwell and Poustie; and 09/959,322 filed Oct. 23, 2001 naming inventors Rogers, Maxwell and Poustie.

This invention relates to planar optical waveguides and, in particular, to planar optical waveguides which include bends.

Optical waveguides exist in two configurations, namely fibre and planar. The planar configuration is convenient for the processing of optical signals and the term "planar" is used because the path regions are located in an essentially two-dimensional space. Typically the path regions are formed of an amorphous material and they are enclosed in a matrix of one or more different amorphous materials ideally having the same refractive index as one another. The refractive index of the matrix is less than the refractive index of the material forming the path regions. The difference between the two refractive indices is often represented by $\Delta n$ and for the condition for effective guidance with low attenuation is usually $$\Delta n = 0.01 \text{(approximately)}.$$

The amorphous materials are preferably glass, e.g. silica based glass or some polymeric material such as an organic plastics material. Silica doped with germania is particularly suitable for the path regions. In the case of the matrix pure silica or silica containing processing aids such as oxides of phosphorus and/or boron are particularly suitable. (Pure silica has a. refractive index of 1.446 and this is a convenient refractive index for the whole of the matrix. Germania increases the refractive index of a silica glass.) It is of course possible to use pure or substantially un-doped silica for the path region with index-depressed doped silica as the cladding. As an alternative to the use of amorphous materials, it is known to use crystalline materials, such as single-crystal silicon (typically epitaxially grown) as the path region. With silicon, the path region is typically surrounded by a lower index amorphous material such as silica or doped silica. It is known however to have both the path and cladding regions formed of single crystal semiconductor materials (again, usually epitaxially grown). Although the invention is described in this application with reference to the use of amorphous materials, which are preferred, the invention has application to waveguides formed of these other material types and no limitation is intended to the use of amorphous materials.

European Patent Specification EP-A-0 583 903 describes arrayed waveguide gratings which consist of an array of curved planar waveguides of different lengths. The waveguides are closely spaced at their ends and widely spaced and strongly curved in the central region. End losses andlor phase errors are reduced at the bends by making the width of the planar waveguide sufficiently large to cause the fundamental mode of the optical signal to be displaced away from the inner edge of the curve. The fundamental mode effectly propagates in the vicinity of the outer edge of the bend and its propagation constant becomes effectively independent of the width of the waveguide. As a result, width variations of the planar waveguide do not contribute to loss and the bend radius can be reduced so that only the fundamental mode is guided round the bend without suffering considerable loss.

Although, as mentioned above, planar waveguiding structures are not fibre, the term "core" is often used to denote the path regions and the matrix in which the cores are embedded is often called the "cladding".

The condition stated above is appropriate for most of a waveguide but this invention relates to special portions where different considerations apply. According to this invention a planar waveguiding device includes regions wherein a segment of core is located adjacent to a groove or between two grooves. Preferably the groove or grooves extend above and below said segment of core. It is desirable that the evanescent fields of signals travelling in the core penetrate into the groove.

The maximum extent of the evanescent fields outside the core is usually less than 1 $\mu$m and therefore any coating between the core and the groove should be less than 500 nm. Preferably there is a direct interface between the core and the groove. Localised heating of cores offers one way of causing localised changes of refractive index, e.g. for Max Zehnder devices. A heating element can be located on top of the core adjacent to one or two grooves. The grooves restrict the transmission of heat.

In some applications material may be located in the groove, e.g. for use as a sensor or for testing the material in the groove. In these applications the material is placed in the groove after the device has been made, e.g. material is placed in the groove and , if necessary, replaced in accordance with requirements.

Usually the purpose of the groove is to provide a very low refractive index adjacent to the core, i.e. to make $\Delta n$ as big as possible. The lowest refractive index, namely 1, is provided by an empty groove (i.e. vacuum) but most gases also have a refractive index substantially equal to one. "Empty" grooves as described above are particularly valuable where cores pass round bends. This is a preferred embodiment of the invention and it will be described in greater detail below.

A high proportion of the cores consists of straight lines but possible uses are severely limited if the cores consist only of straight lines and, in general, signal processing is not possible in planar devices wherein the cores consist only of straight lines. Many planar devices include multiplexers and/or demultiplexers and curves are needed to form these. Curves are also needed if it is desired to create a serpentine path in order to increase its length, e.g. for a laser. Complicated devices, such as arrayed waveguide gratings (AWG), require many bends.

In many devices the radius of curvature of the bend is a critical parameter in determining the overall size of the device. For example, a small radius of curvature will place waveguide segments close together whereas a large radius of curvature will cause the segments to be more widely separated. In order to provide more processing capability on the same size of wafer it is desirable to make the devices as small as possible and, since the radius of curvature is a critical parameter, it is desirable to make the radius of curvature as small as possible. In some cases, the spacing of waveguides on a wafer is determined by external constraints and it may be necessary to use a small radius of curvature in order to conform to the external constraints.

It will be appreciated that a curved path may be a circle or a segment of a circle and in such a case the radius of curvature of the path is constant, i.e. it is equal to the radius of the circle. If a curved path is not circular it will still have a radius of curvature but this radius will vary from point to point along the curve. Nevertheless, it is still true that a small radius of curvature will favour closer packing of devices. It is usually convenient to measure the radius of curvature to the centre of the core but there will be significant differences between the inside and the outside of the curve.

The guidance of optical radiation round shallow bends, e.g. with radii of curvature of 5 mm or more does not cause problems but sharp bends, e.g. with radii of curvature below about 2 mm, can cause noticeable degradation of performance.

These problems can become severe when it is desired to use even smaller radii of curvature, e.g. less than 500 μm.

According to a preferred embodiment of this invention, a planar waveguiding device comprises a core having a bend with an inner radius of curvature and an outer radius said inner radius of curvature being less than 2 mm wherein "empty" grooves are located adjacent to both said inner and said outer radii of curvature, said grooves preferably having an interface with the core and extending both above and below the core. Since the grooves are prepared by etching they will normally extend to the surface of the device but it is desirable to continue the etching below the bottom of the core in order to improve the guidance. It has been stated that the grooves are "empty". Conveniently, the grooves are allowed to contain whatever atmosphere is present where the device is used. In most cases, the atmosphere will be air but, in space there would be a vacuum. The refractive index in the groove is substantially equal to one because this is the refractive index of a vacuum and virtually all gasses have a refractive index equal to one.

In one aspect, this invention is concerned with the problem of loss of guidance at bends which may result in the radiation escaping from the core. The severity of this problem is strongly related to the radius of curvature of the bend and the smaller the radius of curvature the worse the problem. Where the radius of curvature is above 5 mm there is no problem but there is a substantial problem when the radius of curvature is 2 mm or less. The problem gets even worse at smaller radii of curvature, e.g. below 500 μm. The location of grooves will give usefully low attenuation at radii of curvature down to about 50 μm. It will be appreciated that some waveguiding structures will include a plurality of bends. There would be no advantage in providing grooves adjacent to curves with radii of curvature greater than 5 mm and it is highly desirable that all bends with radii of curvature less than 2 mm, and especially less than 500 μm, are provided with grooves in accordance with the invention.

The electric and magnetic fields associated with light propagating in the cores extend outside the cores and, ideally, the groove should be so located and sufficiently wide that these fields are contained entirely in the grooves. For wavelengths of the order 1.5 μm the fields extend for about 1 μm beyond the core. For most purposes, grooves which are 30 μm wide will be sufficient. There is no objection to using greater widths where these are convenient and compatible with the overall structure.

Waveguiding devices in accordance with the invention can be manufactured using conventional fabrication techniques. For example, it is convenient to deposit a sequence of glass layers by flame hydrolysis using conventional photolithography to produce path regions and grooves. In order that there is an interface between the groove and the core, it is appropriate to etch the core to extend beyond the boundaries of the curve and to remove core material when the groove is etched. Reactive ion etching is particularly suitable for producing the grooves because this technique is inherently monodirectional and it produces grooves with vertical sides.

BRIEF DESCRIPTION OF THE DRAWINGS

The invention will now be described by way of example with reference to the company drawings in which:

FIG. 9 illustrates a Max Zehnder device with grooves to enhance thermal control, and.

DETAILED DESCRIPTION OF THE INVENTION

Figure 1:
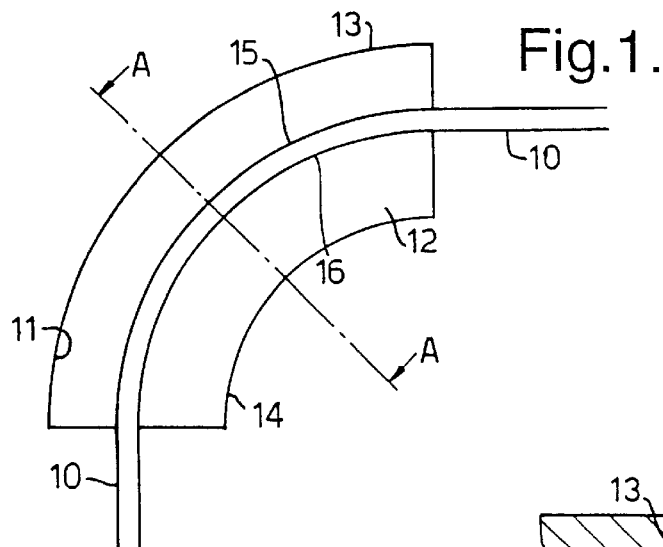
FIG. 1 is a plan view illustrating the location of grooves for a 90° bend.

FIG. 1 illustrates a core 10 which includes a bend through 90°. In accordance with the invention there is an empty groove 11 on the outside of the bend and an empty groove 12 on the inside of the bend.

The refractive index within both grooves is substantially equal to one, e.g. both contain air. (All the refractive indexes quoted in these examples were measured using radiation with a wavelength of 1523 nm).

The core 10 had a square cross section and the sides of the square were 10 μm. The bend is a quadrant of a circle and the radius of the circle (measured to the central line of the core 10) is 125 μm. The outer wall 13 of the groove 11 is also the quadrant of a circle but in this case the circle has a radius of 160 μm. Similarly, inner wall 14 of the groove 12 is also the quadrant of a circle but in this case the circle has a radius of 90 μm. From these dimensions, it will be appreciated that each of the grooves 11 and 12 is 30 μm wide.

Figure 2:
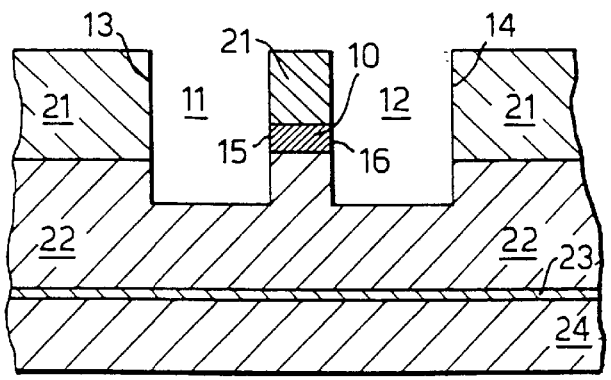
FIG. 2 is a cross section on the radial line AA of FIG. 1.

FIG. 2 shows a vertical cross section along the line AA at FIG. 1. This is a radial cross section and it is substantially identical along any radius of the bend.

FIG. 2 shows the conventional layers of planar waveguiding devices and these layers comprise, from the upper surface downwards:

Covering layer 21 which is formed of silica with processing agents;

Cores 10;

Buffer layer 23 (and optionally 22) which is formed of pure silica (without any additives); and The silicon substrate 24.

(The silicon substrate 24 provides mechanical support for the structure but it may not contribute to the optical function. Usually, the buffer layer 22, 23 is sufficiently thick that the fields associated with optical signals do not penetrate into the silicon substrate 24).

As is conventional for the preparation of glass planar waveguides devices, the starting point was a substrate (which is purchased commercially). The commercial substrate comprised a layer 24 of silicon and the surface of this silicon wafer was oxidised to produce an adherent thin layer 23 of silica (which is part of the buffer layer 22, 23 between the core 10 and the silicon layer 24).

As a first stage of preparation a uniform buffer layer of pure silica was deposited by flame hydrolysis and the residue of this layer is indicated by 22. The core 10 was deposited, originally as a uniform layer on the buffer layer 22 (if desired, the deposited layer 22 can be omitted and the core 10 deposited directly upon the thin layer 23 of silica). This layer was also deposited by flame hydrolysis but $GeCl_4$ was introduced to the flame to produce a layer of silica doped with germania to increase the refractive index of the silica to 1.456. After deposition, the unwanted portions of this layer were removed by conventional photolithography to produce the core 10.

After etching, the whole area was covered by a covering layer 21 of silica by flame hydrolysis and both boron and phosphorous were introduced into this layer to reduce the melting point. The ratio of the boron and phosphorous was adjusted so that the layer 21 has the same refractive index as pure silica, namely 1.446. Originally, the layer 21 was deposited as a fine soot which was melted to give a compact layer 21 which fills all the spaces between the etched core 10. This normally completes the preparation of a planar waveguiding device but, in accordance with the invention, the grooves 11 and 12 were etched. As can be seen from FIG. 2 the grooves 11 and 12 extend completely through the covering layer 21 and into the buffer layer 22. Thus there are interfaces 15 and 16 between the core 10 and the grooves 11 and 12.

The grooves 11 and 12 can be regarded as "empty" because no filling is placed therein. However, any atmosphere in which the device is located will penetrate into the grooves. The atmosphere is gaseous and, in most circumstances, the atmosphere will be air. If the device were used in a spacecraft it is possible that the grooves would contain vacuum. However, the refractive index in the groove is substantially equal to one because this refractive index applies to both vacuum and gasses. The configuration illustrated in FIGS. 1 and 2 has the effect that, at the bend, any fields which extend into the grooves 11, 12 will be located in a region which has a refractive index of one. This has two major effects which will now be described.

The core 10 has a refractive index of approximately 1.456 so that the difference in refractive index between the core 10 and the grooves 11 and 12 is 0.456. This is a very high difference and it gives very strong guidance whereby radiate losses are reduced at the bend and satisfactory guidance round the bend is achieved. However, the interfaces 15 and 16 represent boundaries associated with a high refractive index difference and, therefore, there is substantial loss by scattering from the interfaces 15 and 16. These high scattering losses would not be tolerable over substantial path lengths but the bends only account for a small proportion of the path length and, therefore, high scattering does not result in substantial overall loss. Furthermore, the bend has a small radius of curvature (since the invention is particularly concerned with bends having a small radius of curvature) and, therefore, the circumferential distance around the bend is also small. For example, the distance around the bend illustrated in FIG. 1 (based on the centre of the core 10) is approximately 200 $\mu$m. The height of the core 10 is 10 $\mu$m so that the total area of two interfaces 15, 16 is small, approximately 4000 $(\mu m)^2$.

As mentioned above, the method of producing a planar waveguiding structure is substantially conventional. However, the method of producing the interfaces 15 and 16 will now be described in greater detail.

Figure 3:
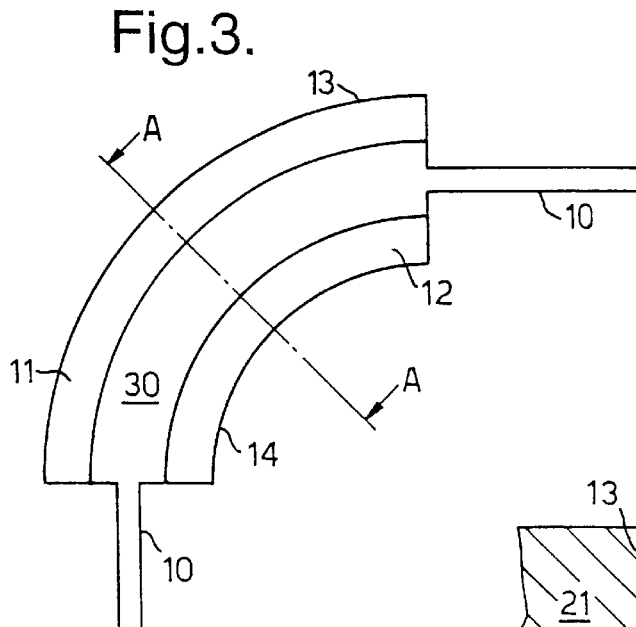
FIG. 3 corresponds to FIG. 1 but illustrating the configuration before the etching of the groove.

FIG. 3 indicates the configuration at the bend immediately before the production of the grooves 11 and 12. When the core 10 was etched a very wide core 30 was left at the bend. As a preparation for etching the grooves 11 and 12, the surface of the device is covered with a mask which leaves apertures over the intended grooves 11 and 12. The grooves 11 and 12 are produced by reactive ion etching which technique is highly directional normal to the surface of the device. This produces grooves with vertical walls but the location of the grooves is controlled by the mask. Thus, the etching removes the material in the grooves including the excess material in the path region 30.

Figure 4:
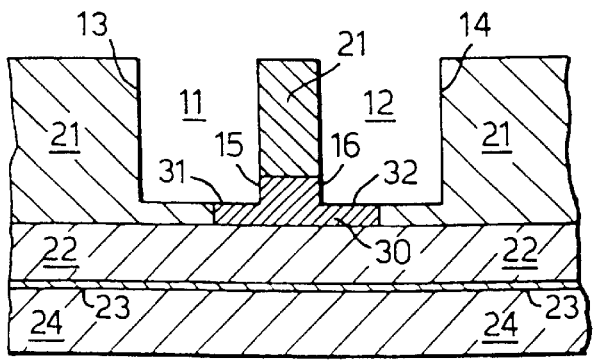
FIG. 4 corresponds to FIG. 2 illustrating the configuration during the etching process.

FIG. 4 is a cross section on the line AA of FIG. 3. It illustrates the configuration produced near the end of the etching. Part of the interfaces 15 and 16 have already been produced but the expanded core 30 has horizontal surfaces 31 and 32 which are exposed to the etching. As the etching proceeds, the surfaces 31 and 32 are eroded until, at the end of the etching, all of the excess 30 has been removed. It will be appreciated that this technique produces the interfaces 15 and 16 during etching and it ensures that these two surfaces form a boundary between-core having a refractive index approximately 1.5 and a groove space having a refractive index substantially equal to one. The effect of this arrangement has already been explained.

Arrayed waveguide gratings (AWG) have several uses in the processing of optical signals. AWG require many, at least 25, usually 50 to 500 and typically about separate paths whereby gratings effects are produced by interference between radiation travelling in different paths. The paths include changes of direction and, for reasons which will be explained later, it is desirable to provide the changes of direction by tight bends, e.g. bends having radii of curvature less than 150 $\mu$m. The structure of such AWG will now be described with reference to FIGS. 5, 6 and 7.

Figure 5:
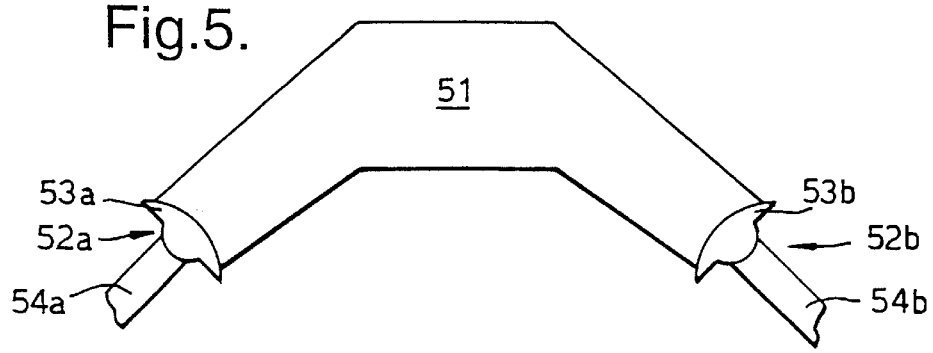
FIG. 5 illustrates the configuration of an arrayed waveguide grating (AWG).

FIG. 5 provides a highly diagrammatic representation of an AWG. The important components of an AWG are a grating region 51 which is shown in greater detail in FIGS. 6 and 7. In order to make external connections the AGW includes input/output IO regions 52a and 52b. Since the paths of light are usually reversible, it is convenient for the input/output IO regions 52a and 52b to be symmetrical, e.g. of identical construction.

Each of the IO regions 52a, 52b comprises an I/O slab 53a, 53b and connector paths 54a, 54b. Each of the IO slabs 53a, 53b is a large region having a uniform refractive index equal to that of the path regions 10. Each I/O slab 53 has curved boundaries, one of which engages with the connectors 54 and the other of which engages with the paths 61, 62, 63 comprised in the grating region 51. It is the function of a I/O slab 53 to distribute radiation received on any one of the connectors 54 uniformly into the plurality of paths comprised in the grating region 51.

Figure 6:
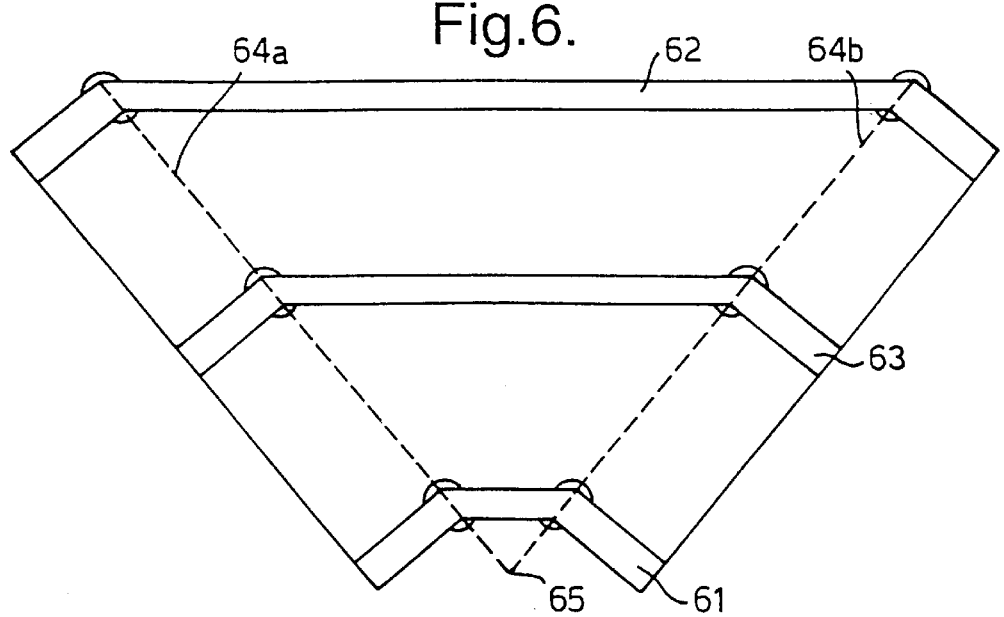
FIG. 6 illustrates the configuration of waveguides and grooves comprised in the AWG of FIG. 5.

FIG. 6 shows the general layout of the grating region 51. As mentioned above, this region comprises plurality of paths but, for ease of illustration, only three paths are illustrated. These are the inner path 61, the outer path 62 and a typical path 63. (The typical path 63 is repeated many times.) The paths have two changes of direction located along the lines 64a and 64b. The effect of these changes of direction is that the path 61 is the shortest and path 62 is the longest. As can be seen from FIG. 6, the paths follow a circuitous route around an approximate centre 65. The paths are graded in length depending upon the distance from the centre 65.

If the length of the shortest path 61 is designated by L$\mu$m then; ideally, the other paths should have lengths of $$L+\Delta L; L+2\Delta L; L+3\Delta L; \ldots L+(n-1)\Delta L;$$

where n is the total number of paths.

It is the purpose of the grating region 51 to produce interference effects by reason of phase changes produced in the various paths. Therefore $\Delta L$ is the critical parameter and it is important that $\Delta L$ shall be constant between any two adjacent paths. Since interference effects are dependent upon fractions of a wavelength (which is typically of the order 1.5 $\mu$m), $\Delta L$ must be very accurate. This imposes the requirement that the total length of the paths must be determined to the same accuracy. The measured length of the path, i.e. the length in micrometers, can be accurately fixed from the photolithography but the effective length of the path is dependent upon other considerations. Since the refractive index controls the speed of propagation of light in the path, it is important that the refractive index, and hence the chemical composition, shall be uniform over the whole of the grating region 51 and this is difficult to achieve with a large region. Furthermore, the irregularities in the cross sectional area of the paths can also effect speeds of propagation. In other words, the uniformity of $\Delta L$ is substantially affected by accurate control of process variables and especially of the chemical composition of the path regions. It is much easier to maintain uniformity over a small region and, therefore, there is a strong incentive to make the grating region 51 as small as possible.

It will be apparent from FIG. 6 that, in order to keep the size of the grating region 51 as small as possible, it is necessary to keep all the path regions as close as possible to the centre 65. For the lengths to be as short as possible, the shortest path 61 must be as short as possible and it is clear that closeness to the centre 65 is important in keeping the path as short as possible. When very short path lengths are used, the configuration along the lines 64a and 64b becomes important. It is not possible to have an abrupt change of direction and, therefore, it is necessary to provide smooth curves for all the paths. It is also necessary to keep the radii of curvature of the path as small as possible. In order to provide adequate guidance at the bends it is appropriate to provide grooves 66 at the inside and outside of every bend. FIG. 6 does not indicate the configuration of the grooves, it merely indicates their location. The configuration of the grooves will be described in greater detail with respect to FIG. 7.

Figure 7:
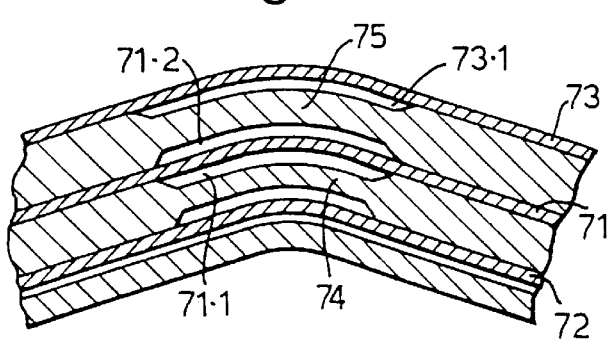
FIG. 7 illustrates the grooves comprised in the AWG of FIGS. 5 and 6.

FIG. 7 illustrates three adjacent paths 71, 72 and 73 at the bends. Although only three paths are shown the same configuration occurs at all bends for all paths. Path 71 has an inner groove 71.1 and an outer groove 71.2 both of which have direct interfaces with the path 71. The grooves 71.1 and 71.2 extend all the way round the curve into the straight portions on both sides of the bend. There is a region 74 of confining glass between the grooves 71.1 and 72.2 and a similar region 75 of confining glass between the grooves 71.2 and 73.1.

Figure 8:
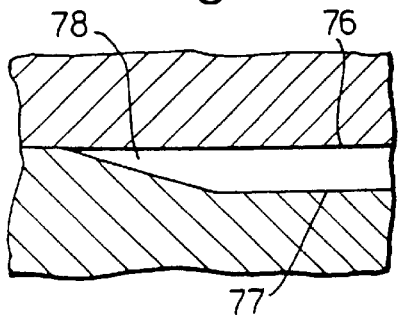
FIG. 8 illustrates the tapers at the ends of grooves as shown in FIG. 7.

The grooves extend into the straight portions and therefore, the ends of the grooves are in straight portions. To avoid sudden transitions (which might adversely affect transition performance) the grooves are preferably tapered as shown in FIG. 8 which illustrates the edge 76 of a path, the edge 77 of confining glass, and the taper 78. The taper rate (not in scale) is 50:1 to 100:1.

Figure 9:
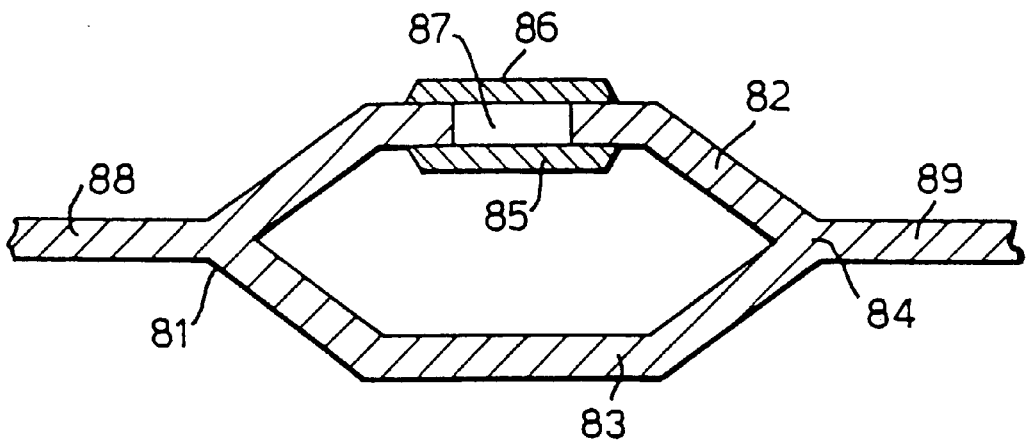
Figure 10:
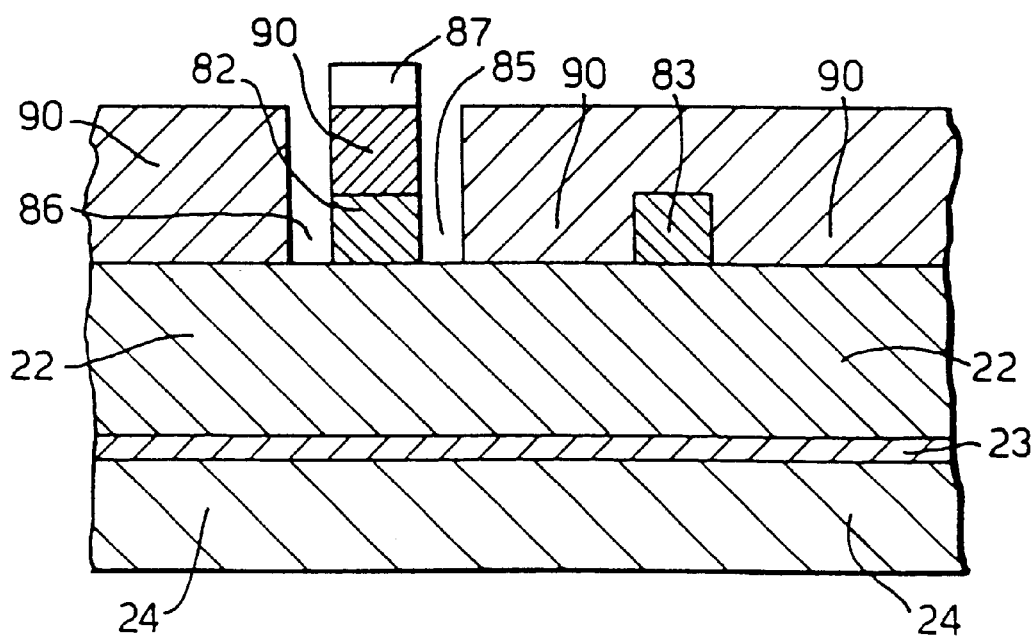
FIG. 10 is cross section through the Max Zehnder device of FIG. 9.

The Max Zehnder device shown in FIGS. 9 and 10 comprises a splitter 81 which divides an input 88 into a first path 82 and a second path 83. These converge at a junction 84 into an output 89. Changing interference effects allows the arrangement to operate as a switch. The first path 82 is located between grooves 85 and 86 and the overlaying confinement 90 is covered with an actuator 87 which is adapted to alter the refractive index of the underlying path 82. The actuator preferably takes the form of an electric heating element 87 (leads not shown). Heating the first path 82 (or a suitable portion thereof) changes the length and refractive index whereby the phase relations at the junction 84 are affected. The grooves 85 and 86 localise the heating effect to give a faster response time. As can be seen most clearly in FIG. 10, the paths 82, 83, 88 and 89 are supported on underlying layers 22, 23 and 24. These layers are similar to those illustrated in FIGS. 2 and 4.

At the splitter 81 and the junction 84 it is appropriate to use curves. Where the radii of the curves are small it is appropriate to locate the curves between grooves as described earlier in this specification.

What is claimed is:

1. A planar device including an arrayed waveguide grating which comprises first and second I/O slabs (53a, 53b) and a grating region (51) interconnecting said first and second I/O slabs (53a, 53b), wherein
   (a) said grating region (51) is enclosed in a cladding region,
   (b) said grating region (51) comprises individual waveguiding cores (61,62,63) of different lengths,
   (c) said cores (61,62,63) of different lengths are adapted to provide wavelength selectivity by causing phase changes in light conveyed between said first and second I/O slabs (53a, 53b), and
   (d) said cores (61,62,63) include bends (71,72,73) for providing said different lengths:

CHARACTERISED IN THAT the planar device includes grooves (71.1, 72.1, 73.1) which extend through said cladding region and are located adjacent to the inside and outside radii of at least some of the bends (71, 72, 73) such that the evanescent fields of signals travelling in the bends (71, 72, 73) extend into the grooves.

2. A planar device according to claim 1, in which the I/O slabs (53) and all of the paths (61, 62, 63) comprised in the grating region (51) are formed of an amorphous material having a constant refractive index and the cladding is an amorphous material having a constant, lower, refractive index than the amorphous material of the core.

3. A planar device according to claim 2, in which the amorphous material of the I/O slabs is a glass and the amorphous cladding material is also a glass.

4. A planar device according to claim 3, in which both the core glass and the cladding glass consist essentially of silica with additives to adjust the refractive index and/or the melting point.

5. A planar device according to claim 1, wherein each groove has a direct interface with its adjacent core.

6. A planar device according to claim 5, wherein the grooves (71, 72, 73) are situated on the inside and outside radii of all bends (71, 72, 73) which have a radius of curvature of less than 500 $\mu$m.

7. A planar device according to claim 1, in which the cores (61, 62, 63) include straight portions located both before and after each bend and the grooves (71) extend into the straight portions.

8. A planar device according to claim 7, in which the ends of the grooves (71) are tapered (78).

9. A planar device according to claim 1, wherein the refractive index inside said grooves is substantially equal to one.

10. A planar device according to claim 1, wherein the grooves (71, 72, 73) are situated on the inside and outside radii of all bends (71, 72, 73) which have a radius of curvature of less than 2 mm.

11. A planar device according to claim 1, in which the grooves (71) extend through the covering layer (21) above the grating region (51) and into the region (22) below the grating region (51).

12. A planar device according to claim 1, in which the number of paths (61, 62, 63) comprised in the grating region (51) is at least 25.

* * * * *